US012169445B2

(12) United States Patent
Jain et al.

(10) Patent No.: US 12,169,445 B2
(45) Date of Patent: Dec. 17, 2024

(54) MONITORING INPUT/OUTPUT AND PERSISTENT RESERVATION ACTIVITY PATTERNS TO DETECT DEGRADED PERFORMANCE OF A HIGH AVAILABILITY AND FAULT TOLERANT APPLICATION

(71) Applicant: Nutanix, Inc., San Jose, CA (US)

(72) Inventors: Anish Jain, Bangalore (IN); Niranjan Sanjiv Pendharkar, Pune (IN); Praveen Kumar Padia, Fremont, CA (US); Shubham Sharma, Pune (IN); Vivek Venkatesan, Apex, NC (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 18/095,271

(22) Filed: Jan. 10, 2023

(65) Prior Publication Data

US 2024/0143462 A1     May 2, 2024

(30) Foreign Application Priority Data

Oct. 27, 2022  (IN) .............................. 202241061241

(51) Int. Cl.
*G06F 11/00*     (2006.01)
*G06F 11/07*     (2006.01)
(Continued)

(52) U.S. Cl.
CPC .......... *G06F 11/203* (2013.01); *G06F 11/076* (2013.01); *G06F 11/3075* (2013.01)

(58) Field of Classification Search
CPC .. G06F 11/2033; G06F 11/203; G06F 11/076; G06F 11/2043; G06F 11/2046
See application file for complete search history.

(56) References Cited

U.S. PATENT DOCUMENTS 8,549,518 B1   10/2013   Aron et al.
8,601,473 B1   12/2013   Aron et al.
(Continued)

OTHER PUBLICATIONS

Cano, Ignacio, "Curator: Self-Managing Storage for Enterprise Clusters" University of Washington; published Mar. 2017; pp. all.
(Continued)

*Primary Examiner* — Philip Guyton
(74) *Attorney, Agent, or Firm* — Cesari and McKenna, LLP (57) ABSTRACT

A technique monitors input/output (I/O) and Persistent Reservation (PR) activity patterns to detect degraded performance of a highly available and fault tolerant application executing in a multi-site disaster recovery (DR) environment. Multiple instances of the application execute in different virtual machines (VMs) of a compute layer within a guest clustering configuration that extends across clusters of the sites. A storage layer of the clusters provides shared storage to the multiple VMs across the multiple sites. One of the sites is configured as an active storage site configured to receive and service I/O requests from the compute layer. A single instance of the application is active at a time and configured as a "compute owner" of the shared storage to issue the I/O requests to the shared storage. The compute owner and active storage site may not be co-located on the same site, leading to excessive I/O and PR activity patterns indicative of degraded performance. Upon detecting such patterns, the technique automatically triggers a storage failover to ensure that compute owner and active storage site are co-located at the same site.

30 Claims, 5 Drawing Sheets

(51) Int. Cl.
*G06F 11/20* (2006.01)
*G06F 11/30* (2006.01)

(56) References Cited

U.S. PATENT DOCUMENTS

| | | | |
|---|---|---|---|
| 8,850,130 | B1 | 9/2014 | Aron et al. |
| 8,863,124 | B1 | 10/2014 | Aron et al. |
| 9,009,106 | B1 | 4/2015 | Aron et al. |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,747,287 | B1 | 8/2017 | Bhardwaj et al. |
| 9,772,866 | B1 | 9/2017 | Aron et al. |
| 11,194,680 | B2 | 12/2021 | Konka et al. |
| 11,218,418 | B2 | 1/2022 | Gupta et al. |
| 11,436,097 | B1 | 9/2022 | Kumar et al. |
| 2017/0359243 | A1* | 12/2017 | Deuri .................. H04L 43/08 |
| 2019/0220375 | A1* | 7/2019 | Furuya ............... G06F 11/1658 |
| 2022/0188042 | A1 | 6/2022 | Tatiparthi et al. |
| 2022/0217204 | A1 | 7/2022 | Tatiparthi et al. |
| 2022/0229746 | A1 | 7/2022 | Jindal et al. |
| 2022/0244856 | A1 | 8/2022 | Kataria et al. |
| 2022/0253243 | A1 | 8/2022 | Kataria et al. |
| 2022/0269571 | A1 | 8/2022 | Mantri et al. |

OTHER PUBLICATIONS

Citrix XenDesktop 7.1 on Microsoft Hyper-V Server 2012 R2 on Nutanix Virtual Computing Platform Solution Design Citrix Validated Solutions, Jun. 25, 2014, 95 pages.

Nutanix Metro Availability Witness Option, printed from https://nutanix.com/installation-configuration-23/metro-availability-witness-option-3837, 44 pages.

Poitras, Steven "The Nutanix Bible" from http://stevenpoitras.com/the-nutanix-bible/ Oct. 15, 2013 (Publication date based on indicated capture date by Archive.org first publication date unknown) pp. all.

Poitras, Steven "The Nutanix Bible—Classic Edition" from https://nutanixbible.com/, dated Sep. 9, 2022, 262 pages.

Aarthi Kambhampati—"Witness VM and why you might need it" Nutanix community web page, printed on Oct. 10, 2023 from https://next.nutanix.com/how-it-works-22/witness-vm-and-why-you-might-need-it-38343, 1 page.

* cited by examiner

MONITORING INPUT/OUTPUT AND PERSISTENT RESERVATION ACTIVITY PATTERNS TO DETECT DEGRADED PERFORMANCE OF A HIGH AVAILABILITY AND FAULT TOLERANT APPLICATION

CROSS-REFERENCE TO RELATED APPLICATIONS

The present application claims the benefit of India Provisional Patent Application Serial No. 202241061241, which was filed on Oct. 27, 2022, by Anish Jain, et al. for MONITORING INPUT/OUTPUT AND PERSISTENT RESERVATION ACTIVITY PATTERNS TO DETECT DEGRADED PERFORMANCE OF A HIGH AVAILABILITY AND FAULT TOLERANT APPLICATION, which application is hereby incorporated by reference.

BACKGROUND

Technical Field

The present disclosure relates to data redundancy and, more specifically, to data redundancy in a high availability and fault tolerant application environment.

Background Information

Data redundancy generally involves copying or replicating data among multiple datacenters to enable continued operation of data processing operations in a multi-site data replication environment, such as disaster recovery (DR) environment. As used herein, the multi-site data replication environment includes two or more datacenters, i.e., sites, which are often geographically separated by relatively large distances and connected over a communication network, e.g., a wide area network. For example, data at a local datacenter (primary site) may be replicated over the network to a remote datacenter (secondary site) located at a geographically separated distance to ensure continued application availability at the secondary site in the event of a failure of the primary site.

A highly available and fault tolerant application may use data redundancy and failover to ensure multiple instances of the application are available at multiple sites to tolerate site or storage failures in a DR environment. In such an environment the application typically has a single active instance at a time that issues input/output (I/O) requests to an active storage site of the environment using, e.g., clustering software to ensure consistency and avoid contention among the other application instances. Usually, the active application instance and active storage site are located at the same site to ensure high performance. However, in response to a disaster, the site of one, i.e., the active application instance site or the active storage site, may not remain co-located with the other, resulting in increased latency with likely decreased throughput that lead to degraded performance.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a technique configured to monitor input/output (I/O) and Persistent Reservation (PR) activity patterns to detect degraded performance of a highly available and fault tolerant application executing in a multi-site disaster recovery (DR) environment. Illustratively, multiple instances of the application execute in different virtual machines (VMs) of a compute layer within nodes of a guest cluster (i.e., a virtual cluster layered on top of a host cluster) configured to extend across sites to other clusters of the DR environment. High availability and fault tolerance may be realized by running the application within the guest cluster using clustering software such as, e.g., Microsoft Windows Failover Cluster or Linux Pacemaker. A storage layer of the clusters provides shared storage to the multiple VMs across the multiple sites. At least one of the sites is defined as an active storage site configured to service I/O requests from the compute layer efficiently. The guest clustering configuration ensures that only non-contending instances of the application are active at a time for the shared storage by configuring the active instance as a "compute owner" of the shared storage, i.e., configured to issue the I/O requests to the shared storage exclusive of any contending application instances during a split-brain scenario by granting owner permission via PRs. Illustratively, the compute owner and active storage site are preferably co-located at the same site to ensure high performance. However, in response to a site or VM failure and subsequent failover, the compute owner and active storage site may not be located on the same site, leading to changes in expected I/O and/or PR activity, detectable by specific patterns or changes in those patterns as indicative of degraded performance. Upon detecting such patterns, the technique determines that the active application and shared storage are located at different sites and automatically triggers a storage failover to ensure co-location of the compute owner and active storage sites, i.e., ensure they are located at the same site for improved performance.

DESCRIPTION

Figure 1:
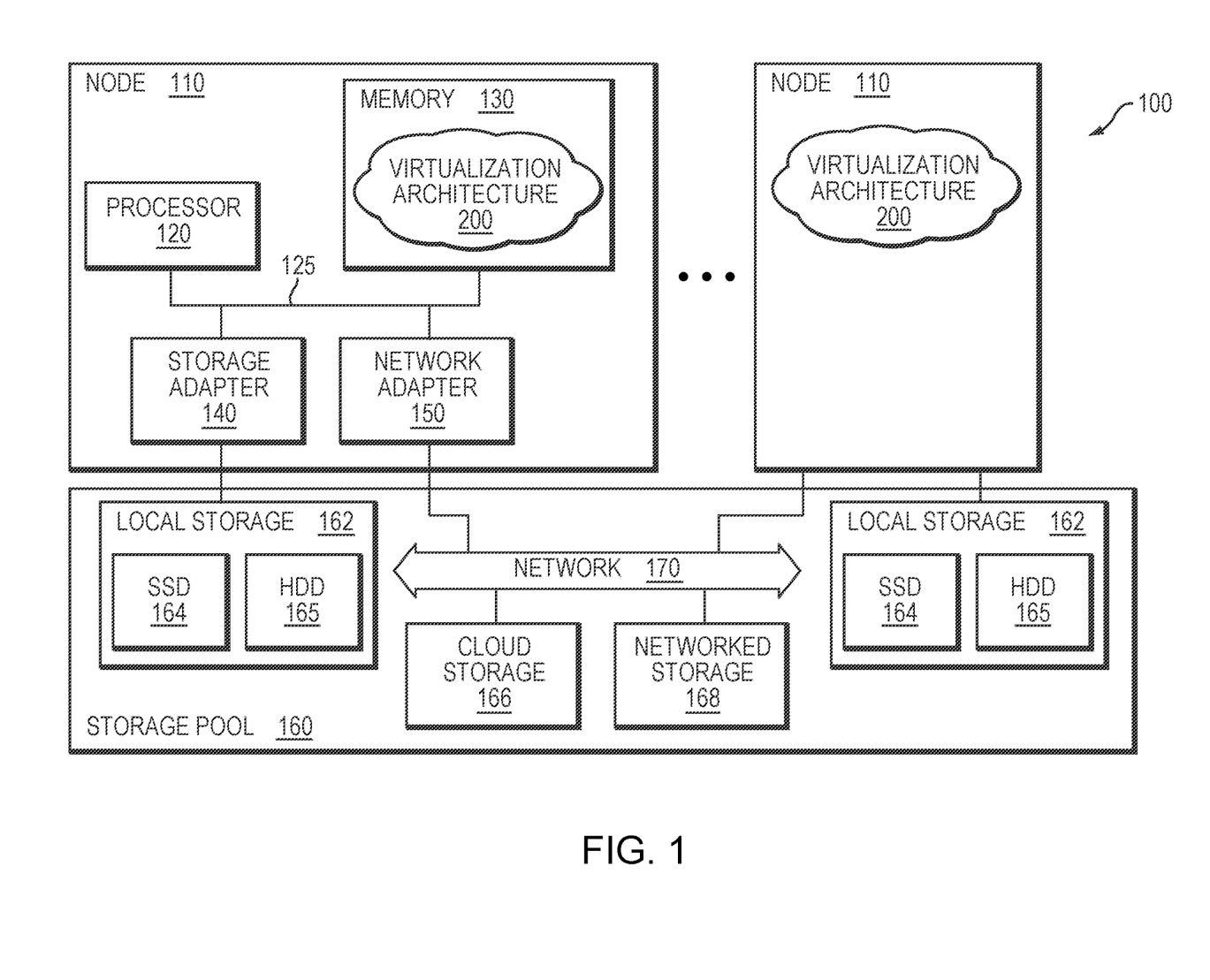
FIG. 1 is a block diagram of a plurality of nodes interconnected as a cluster in a virtualized environment.

FIG. 1 is a block diagram of a plurality of nodes 110 interconnected as a cluster 100 and configured to provide compute and storage services for information, i.e., data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over a network, which is illustratively an Ethernet local area network (LAN) 170. The network adapter 150 may thus be embodied as a network interface card having the mechanical, electrical and signaling circuitry needed to connect the node 110 to the LAN. In an embodiment, one or more intermediate stations (e.g., a network switch, router, or virtual private network gateway) may interconnect the LAN with network segments organized as a wide area network (WAN) to enable communication between the nodes of cluster 100 and remote nodes of a remote cluster over the LAN and WAN (hereinafter "network") as described further herein. The multiple tiers of SOCS include storage that is accessible through the network, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. Communication over the network may be effected by exchanging discrete frames or packets of data according to protocols, such as the Transmission Control Protocol/Internet Protocol (TCP/IP) and User Datagram Protocol (UDP), as well as protocols for authentication, such as the OpenID Connect (OIDC) protocol, and other protocols for secure transmission, such as the HyperText Transfer Protocol Secure (HTTPS) may also be advantageously employed.

The main memory 130 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes, and programs being embodied as logic, components, and/or modules consisting of hardware, software, firmware, or combinations thereof.

Figure 2:
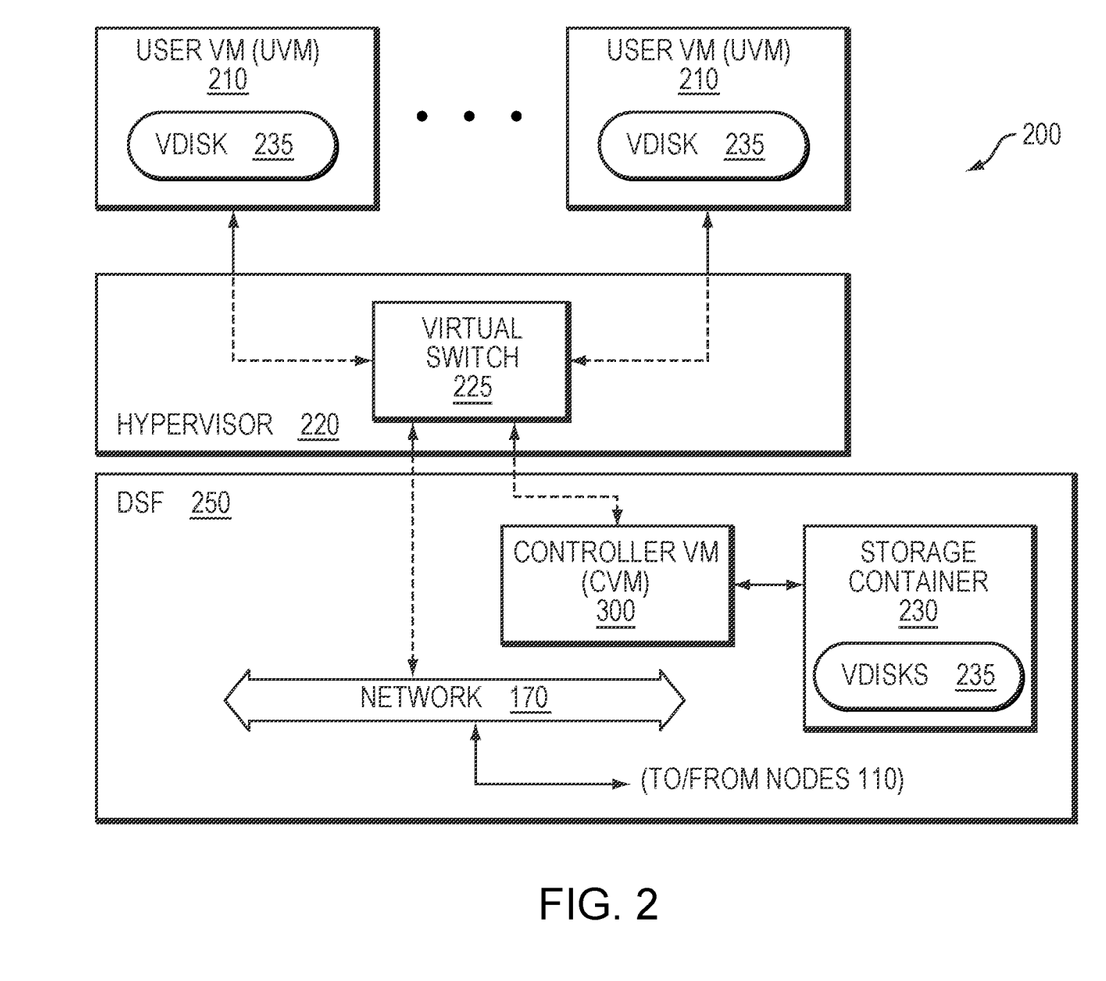
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyper-convergence architecture wherein the nodes provide both storage and computational resources available cluster wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 300. This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably the IP-based storage protocol request packets may remain in the node 110 when the communication—the request and the response-begins and ends within the hypervisor 220. In other embodiments, the IP-based storage protocol request may be routed by the virtual switch 225 to a CVM 300 on another node of the same or different cluster for processing. Specifically, the IP-based storage protocol request may be forwarded by the virtual switch 225 to an intermediate station (not shown) for transmission over the network (e.g., WAN) to the other node. The virtual switch 225 within the hypervisor 220 on the other node then forwards the request to the CVM 300 on that node for further processing.

Figure 3:
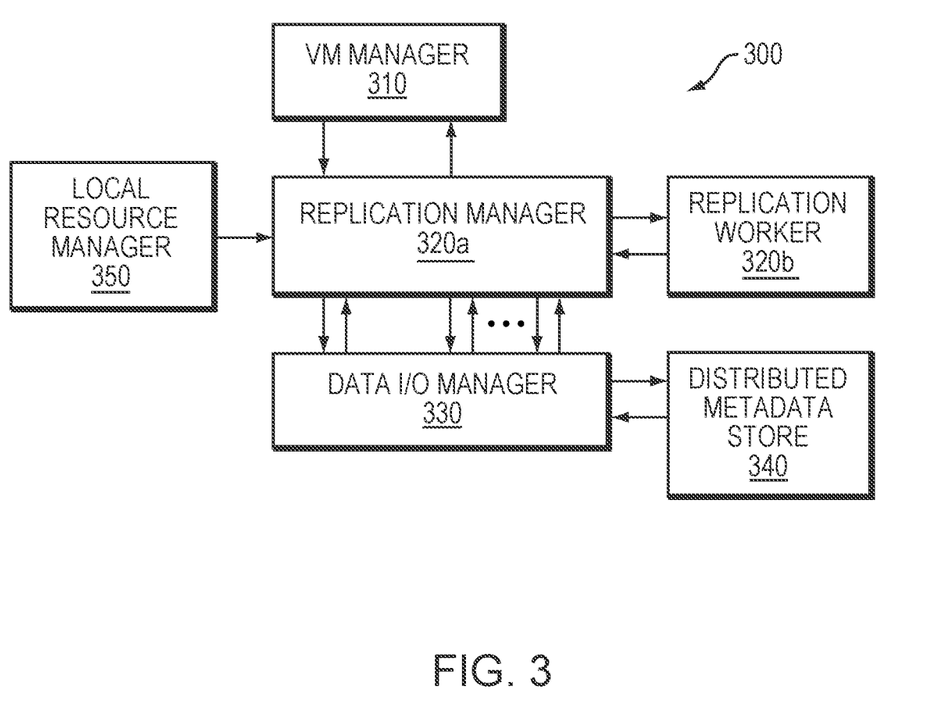
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 3M functions as a distributed storage controller to manage storage and I/O activities within DSF 250 of the cluster 100. Illustratively, the CVM 30) runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack that may be decomposed into a plurality of threads running in a user space of the operating system of the CVM to provide storage and I/O management services within DSF 250. In an embodiment, the user mode processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A local resource manager 350 allows users (administrators) to monitor and manage resources, e.g., such as storage, of the cluster. A replication manager 320a is configured to provide replication and disaster recovery services of DSF 250 and, to that end, cooperates with the local resource manager 350 to implement the services, such as migration/failover of virtual machines and containers, as well as scheduling of snapshots. In an embodiment, the replication manager 320a may also interact with one or more replication workers 320b. A data I/O manager 330 is responsible for all data management and I/O operations in DSF 250 and provides a main interface to/from the hypervisor 220, e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Data redundancy generally involves copying or replicating data among one or more nodes 110 of clusters 100 embodied as, e.g., datacenters to enable continued operation of data processing in a multi-site data replication environment, such as backup, content distribution and disaster recovery. The multi-site data replication environment includes two or more datacenters, i.e., sites, which are typically geographically separated by relatively large distances and connected over a communication network, such as a WAN. For example, data at a local datacenter (primary site) may be replicated over the network to a remote datacenter (secondary site) located at a geographically separated distance to ensure continuity of application availability in the event of a failure of the nodes at the primary site.

Replication (e.g., synchronous or asynchronous replication) may be used to replicate the data between the sites such that each update to the data at the primary site is copied to the secondary site. For instance, every update (e.g., write operation or management information) issued by a UVM 210 to data designated for failover (i.e., failover data) is continuously replicated from the primary site to the secondary site before the write operation is acknowledged to the UVM. Thus, if the primary site fails, the secondary site has an exact (i.e., mirror copy) of the failover data at all times. Synchronous replication generally does not require the use of snapshots of the data; however, to establish a multi-site data replication environment or to facilitate recovery from, e.g., network outages in such an environment, a snapshot may be employed to establish a point-in-time reference from which the sites can (re)synchronize the failover data.

Figure 4:
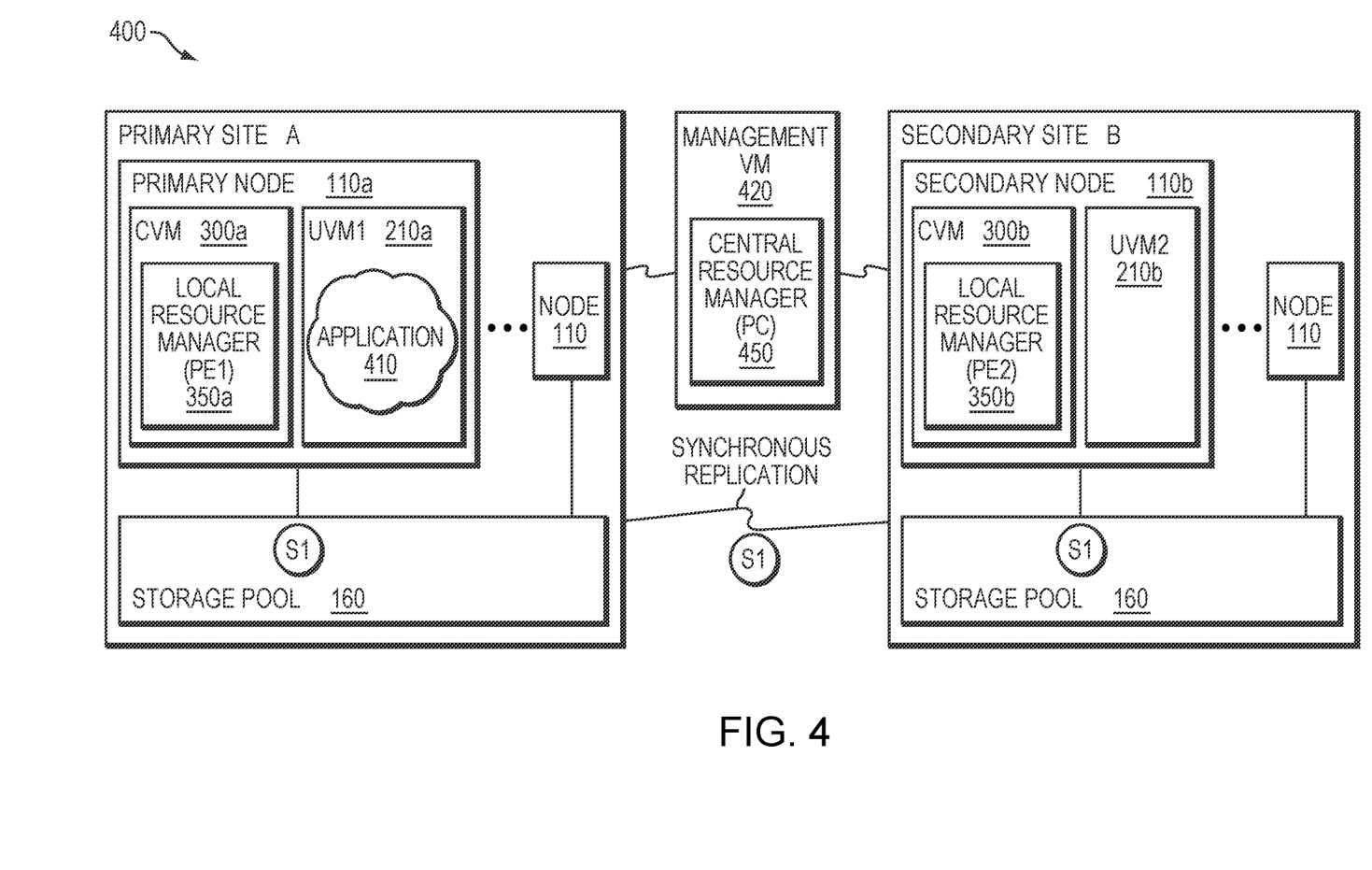
FIG. 4 is a block diagram of an exemplary multi-site data replication environment configured for use in various deployments such as disaster recovery (DR)

FIG. 4 is a block diagram of an exemplary multi-site data replication environment configured for use in various deployments, such as for disaster recovery (DR). Illustratively, the multi-site environment 400 includes two sites: primary site A and secondary site B, wherein each site represents a datacenter embodied as a cluster 100 having one or more nodes 110. A category of data (e.g., an application 410 of one or more UVMs 210) running on primary node 110a at primary site A is designated for failover to secondary site B (e.g., secondary node 110b) in the event of failure of primary site A. A snapshot S1 of the data is generated at the primary site A and replicated (e.g., via synchronous replication) to secondary site B as a base or "common" snapshot S1.

Illustratively, a highly available and fault tolerant application may use data redundancy and failover to ensure multiple instances of the application are available at multiple sites to tolerate site or storage failures in a DR environment. One approach to achieving high availability and fault tolerance involves running the application within a guest cluster configured from VMs of the cluster (i.e., a virtual cluster layered on top of the cluster acting as a host cluster) using clustering software such as, e.g., Microsoft Windows Failover Cluster or Linux Pacemaker to ensure consistency and avoid contention among the other application instances. In such a configuration, the multiple instances of the application run inside different virtual machines (e.g., UVMs 210) as a part of a computer layer of nodes in failover clusters at the sites and wherein the UVMs have access to shared storage across the sites. The clustering configuration software ensures that only non-contending instances of the application are active at a time by making one of the UVMs 210 (i.e., one instance of the application contending for the shared storage) an "owner" of the shared storage, e.g., through the use of Persistent Reservations (PRs). A quorum mechanism (e.g., a compute witness) for the compute layer may also be provided by the clustering software (e.g., a third entity available in a different fault domain) to mediate ownership in case of a failure leading to a split-brain scenario that may be caused by, e.g., a failure or network partition.

In an embodiment, the local resource managers 350a,b run in management and control planes of the various datacenter sites (e.g., within clusters at the sites) in the multi-site environment 400 and cooperate with a central resource manager 450 (process) running on a management VM 420 in a different fault domain of the environment. To that end, the local resource manager 350a (e.g., PE1) runs on a CVM 300a of primary node 110a at the primary site A and local resource manager 350b (e.g., PE2) runs on a CVM 300b at secondary nodes 110b of secondary site B. The central resource manager 450 (e.g., PC) illustratively provides an administrator interface embodied as a website to provide a "pane of glass" (i.e., a cluster-wide administrative view and control panel) for managing and controlling multiple clusters via the local resource managers 350a,b. As a result, the central resource manager 450 may illustratively run on a management VM 420 located on any node of a cluster at the primary or secondary sites.

A storage layer (including local resource managers PE1 and PE2) of the clusters may provide the shared storage to the multiple VMs, wherein the shared storage is embodied as, e.g., storage devices of storage pool 160 and exposed via a storage protocol (e.g., SCSI) using replication across the multiple sites. One of the sites (e.g., the primary site A) is an active storage site configured to receive I/O requests (e.g., the storage owner PE1), such as configuration changes or writes, issued from a UVM application 410 (e.g., the compute owner) to the primary site A, which may replicate (mirror) the writes to a secondary site B (e.g., a passive storage site including PE2) as replicas. Illustratively, the writes are persisted on both sites before they are acknowledged to the compute owner. Although it may accept writes, the passive storage site typically forwards them to the active storage site (storage owner) to ensure ordering and consistency. A similar quorum mechanism (e.g., a storage witness) is also required for the storage layer to mediate ownership in case of a network partition or failure.

In certain embodiments of the DR environment, the compute and storage witnesses may be provided by different vendors which may lead to uncoordinated failover between the application and shared storage. As a result, there is a chance that, in response to a failure, the witnesses arrive at different decisions leading to scenarios where the compute owner and active storage site (i.e., storage owner) are not co-located. For example, assume the compute owner is UVM1 210a on the active storage site and the storage owner is PE1 350a on the active storage site. If UVM1 fails, the compute owner changes to UVM2 210b on the passive storage site, but the storage owner remains PE1 on the active storage site. This scenario can adversely affect the application 410 as it may require forwarding of the reads/writes from the passive storage site to the active storage site, causing increased latency, possible decreased throughput, and decreased performance.

Generally, storage vendors provide a failover workflow to move the storage ownership from one site to another. In most cases, this is done in response to a disaster when storage is unavailable on one of the sites (e.g., unplanned failover) or administratively, e.g., when an administrator performs planned maintenance triggering a planned failover (PFO) workflow in an orderly fashion. However, in a high availability and fault tolerant DR environment, the compute owner of shared storage (e.g., UVM1) may failover independently of the active storage owner (e.g., PE1) in an unpredictable manner, which leads to degraded performance if the compute owner fails-over to a site not having the storage owner, i.e., a site in which the computer is not co-located with the storage owner. As a result, in a synchronous replication scenario, the non-owner/passive storage site then acts as a proxy and forwards all reads/writes/configuration change requests to the owner/active storage site. The active storage site then performs the update on both sites and forwards the response back to the passive storage site after which the user receives the acknowledgment response. This scenario adds at the very least latency to every request.

Figure 5:
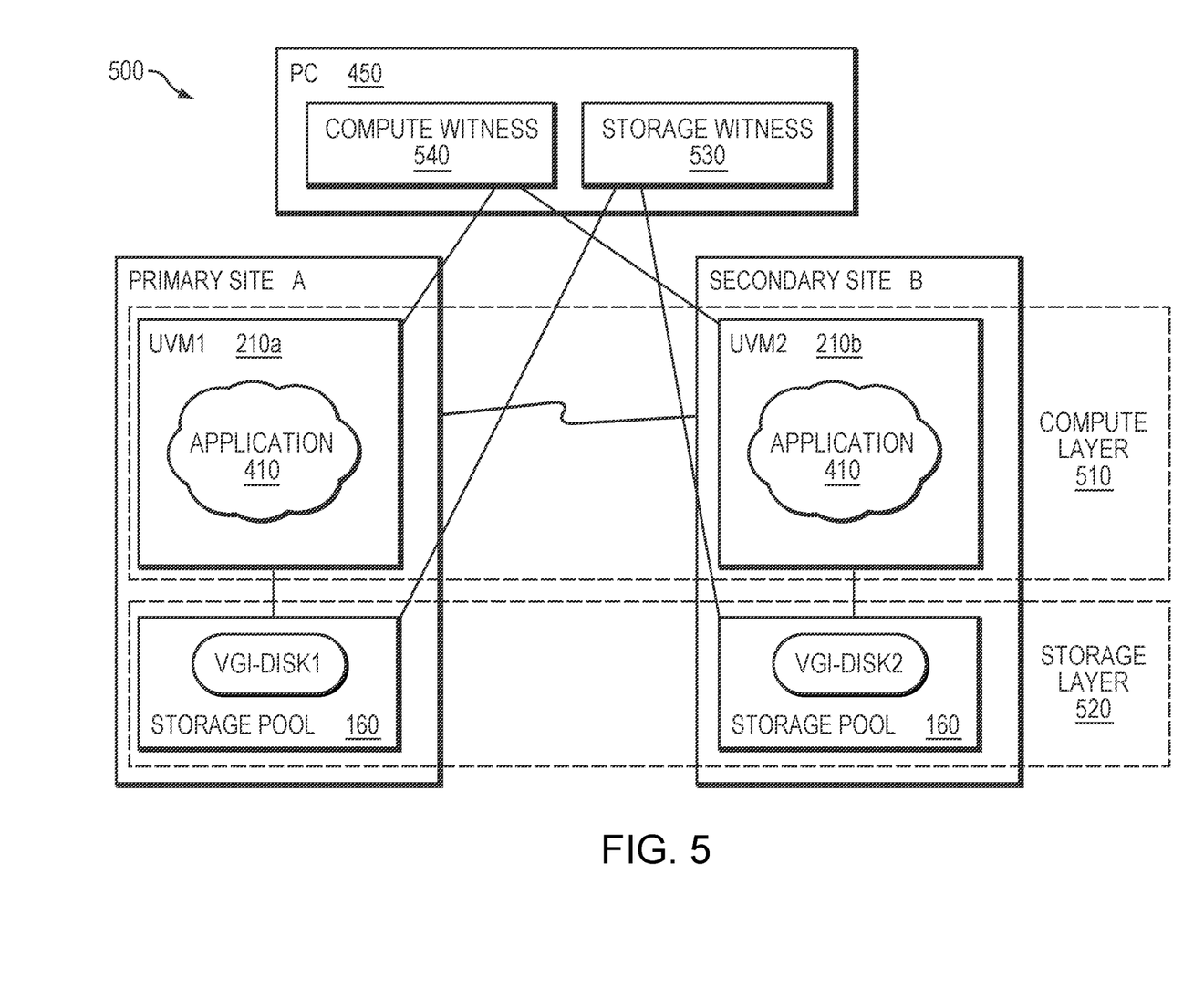
FIG. 5 is an exemplary block diagram illustrating a DR pattern detection technique.

The embodiments described herein are directed to a technique configured to monitor input/output (I/O) and Persistent Reservation (PR) activity patterns to detect degraded performance of a high availability and fault tolerant application executing in a multi-site disaster recovery (DR) environment. FIG. 5 is an exemplary block diagram illustrating a DR pattern detection technique 500. Multiple instances of the application 410 execute in different UVMs of a compute layer 510 within a guest cluster (i.e., a virtual cluster layered on top of the host cluster) configured to extend across clusters 100 (e.g., cluster 1 and cluster 2) of the sites A and B. A storage layer 520 of the clusters provides shared storage of storage pool 160 to UVMs 210 (e.g., UVM1 and UVM2) across the multiple sites. At least one of the sites is defined as an active storage site configured to service I/O requests from the compute layer 510. The guest clustering configuration ensures that only non-contending instances of the application 410 are active at a time for the shared storage by configuring the active instance executing in one of the UVMs as a "compute owner" of the shared storage, i.e., configured to issue the I/O requests to the shared storage exclusive of any contending application instances by granting owner permission via PRs. Illustratively, the compute owner and active storage site are preferably co-located at the same site to ensure high performance. However, in response to a failure and subsequent failover, the compute owner and active storage site may not be located on the same site, leading to changes in expected I/O and PR activity, detectable by specific patterns or changes in those patterns as indicative of degraded performance. Upon detecting such patterns, the technique determines that the active application and shared storage are located at different sites and automatically triggers a storage failover to ensure co-location of the compute owner and active storage site, i.e., ensure they are located at the same site.

In an embodiment, a cluster shared volume, e.g., a volume group (VG), may include a single storage device such as a disk. Where the VG includes multiple disks, compute ownership of the shared storage may be at the disk level, e.g., UVM1 is owner of disk1 in the VG1 and UVM2 is the owner of disk2 in VG1. Notably, using short duration patterns of monitored I/O forwarding behavior between the UVMs and shared storage to determine that the application and shared storage are not co-located so as to trigger (active storage site) storage failover, may lead to "ping-pong" failover activity. To minimize such activity, the technique provides a sliding window time interval (e.g., 5 mins) where statistics are gathered/collected relating to monitoring of I/O activity, e.g., the amount of data transferred to a cluster/site and the amount of data transferred from the site. Illustratively, data I/O manager 330 of CVM 300 is a data plane service that collects the statistics and stores them as metadata in distributed metadata store 340. The collected statistics are then processed to compute a ratio representative of an I/O pattern. Replication manager 320a of CM 300 is a control plane service that processes the statistics, e.g., to determine if thresholds are met for predetermined PR and I/O activity patterns. Based on a certain value (e.g., a failover threshold) of the computed ratio, a determination to failover storage is rendered. Essentially, the ratio is based on an amount of I/O activity processed locally at a site versus an amount of I/O activity forwarded from the site to the other site for processing. Once the failover threshold is met or exceeded, a storage witness (e.g., running on PC 450) is notified (by replication manager 320a) via an application programming interfaces (API) pertaining to the storage witness to trigger a planned failover (PFO) of storage.

In addition to monitoring I/O activity to detect I/O patterns, the technique monitors PR activity to detect PR patterns. Illustratively, when a UVM takes over ownership of shared storage (e.g., one or more disks of a VG), the application 410 running in the UVM (e.g., UVM1) maintains a lock on the storage (e.g., disk1) using SCSI persistent reservations (PRs) to record certain metadata indicating that it is the compute owner of the storage. For example, if UVM1 is the current compute owner, metadata is stored (marked or recorded) on disk1 of the VG indicating that UVM1 is the current owner. If UVM2 attempts to take over ownership of disk1, UVM2 sends a SCSI PR request to the storage layer 520 of the (active or passive) storage site to mark its metadata on the disk, thereby pre-empting ownership by UVM1. According to the technique, the occurrence of such storage ownership takeover activity is a heuristic that may result in a PR pattern that, upon detection by replication manager 320a, triggers initiation of the sliding window interval (to monitor I/O patterns). That is, observing a pattern of PR activity matching a pattern consistent with failover activity of the application triggers monitoring of I/O patterns according to the sliding window interval to determine whether the application and shared storage remain co-located.

In an embodiment, I/O patterns are established by I/O activity observed during the sliding window intervals. If minimal activity is observed (i.e., activity below the failover threshold), failover is not triggered. However, if there is substantial I/O activity satisfying a predetermined I/O pattern, a PFO is triggered. The I/O activity may be application-dependent and, thus, the failover threshold may vary and is configurable as set by the administrator, e.g., via the administrative interface, depending on the application. Moreover, monitoring of I/O activity during a sliding window interval may be triggered by PR request activity that satisfies a predetermined PR pattern established as consistent with failover activity of the application. The I/O and PR activity patterns are monitored across clusters/sites (failover domains) wherein the storage witness 530 is not coordinated with (i.e., does not communicate with) the compute witness 540 (e.g., running on PC 450).

In an embodiment, the configurable failover threshold may be tied to each VG separately (as accessed by a separate compute owner UVM). Illustratively, synchronous replication is supported at the VG level so that the technique enables storage failover at a VG. Thus, there may be different failover thresholds for different VGs, where some VGs failover and others do not. Note that typically entire storage arrays failover in response to a DR event; however, the technique enables a specific storage partition (VG) of the cluster storage to failover.

Specifically, the technique described herein allows setting of parameters, such as failover thresholds, at the VG level and monitoring of I/O patterns during a sliding window interval triggered by PR activity. If the failover threshold is exceeded, the storage witness 530 is instructed to trigger (initiate) failover of the VG from an active storage site (e.g., primary site) to a passive storage site (e.g., secondary site), thereby transforming the VG at the secondary site to the active storage site. The administrator may set the parameters (e.g., a failover threshold as well as a sliding window time interval) per VG.

As for PR pattern detection, the technique does not immediately initiate the storage failover, but rather waits for yet another threshold (e.g., a time threshold) to determine whether there are other PR changes that occur (as a heuristic) during that time threshold before enabling failover that arises from monitoring of I/O patterns. That is, the technique monitors PR activity looking for a predetermined PR pattern before triggering the sliding window interval, where I/O activity is monitored to detect a predetermined I/O pattern to shared (VG) storage that suffices to initiate failover of the shared storage.

In an embodiment, the monitored (observed) PR and I/O activity patterns and associated thresholds may be defined as rules that are configurable by an administrator and that dictate how failover is triggered, e.g., on an application basis. As noted, the storage witness 530 need not receive information from (need not be coordinated with) the compute witness 540 and, as such, storage failover is independent of application failover. That is, storage failover is based entirely on storage statistics and behavior without regard to any direct indication of UVM failover or migration, however, to determine whether the UVM and storage remain co-located, and, if not, initiate failover of the shared storage to re-co-locate the application and shared storage.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A non-transitory computer readable medium including program instructions for execution on a processor of a multi-site disaster recovery (DR) environment, the program instructions configured to:
monitor input/output (I/O) accesses and storage ownership takeover activity from a fault tolerant application executing on a first site configured for failover to a second site of the DR environment, wherein the I/O accesses are directed to shared storage replicated from the first site to the second site, and wherein the storage ownership takeover activity is directed to establishing and pre-empting ownership of the shared storage;
detect patterns of the I/O accesses and storage ownership activity indicating degraded I/O performance to determine whether the fault tolerant application and the shared storage are co-located at the first site; and
in response to determining that the fault tolerant application and shared storage are no longer co-located at the first site, trigger a failover of the shared storage to ensure co-location with the fault tolerant application.

2. The non-transitory computer readable medium of claim 1, wherein the program instructions configured to monitor I/O accesses and storage ownership takeover activity includes program instructions configured to monitor a Persistent Reservations (PR) pattern of activity to ensure that the failover of the fault tolerant application and the shared storage are co-located at the first site.

3. The non-transitory computer readable medium of claim 1, wherein the program instructions configured to detect patterns of the I/O accesses and storage ownership takeover activity includes program instructions configured to determine whether the patterns exceed a threshold of pre-determined patterns of I/O activity.

4. The non-transitory computer readable medium of claim 1, wherein the program instructions configured to detect patterns of the I/O accesses and storage ownership takeover activity is based on a sliding window of the monitored I/O accesses.

5. The non-transitory computer readable medium of claim 1, wherein the fault tolerant application is part of a layered guest cluster having a compute witness for failover of the fault tolerant application, and wherein the determination that the fault tolerant application and shared storage are no longer co-located at the first site is independent of the compute witness.

6. The non-transitory computer readable medium of claim 1, wherein during degraded I/O performance, a failover of the fault tolerant application to the second site proxies the I/O accesses to the shared storage at the first site.

7. The non-transitory computer readable medium of claim 1, wherein the detected patterns of I/O accesses and storage ownership takeover activity are configurable per fault tolerant application.

8. The non-transitory computer readable medium of claim 1, wherein failover of the fault tolerant application is uncoordinated with failover of the shared storage.

9. The non-transitory computer readable medium of claim 1, wherein the program instructions configured to detect patterns of I/O access and storage ownership takeover activity includes program instructions configured to gather statistics of an amount of data transferred during a sliding window time interval.

10. The non-transitory computer readable medium of claim 1, wherein an administratively initiated maintenance triggers failover of one of the fault tolerant application or the shared storage such that they are no-longer co-located.

11. A method comprising:
monitoring input/output (I/O) accesses from a fault tolerant application executing on a first site of a multi-site disaster recovery (DR) environment configured for failover to a second site of the DR environment, wherein the I/O accesses and storage ownership takeover activity are directed to shared storage replicated from the first site to the second site and wherein the storage ownership takeover activity is directed to establishing and pre-empting ownership of the shared storage;
detecting patterns of the I/O accesses and storage ownership takeover activity indicating degraded I/O performance to determine whether the fault tolerant application and the shared storage are co-located at the first site; and
in response to determining that the fault tolerant application and shared storage are no longer co-located at the first site, triggering a failover of the shared storage to ensure co-location with the fault tolerant application.

12. The method of claim 11, wherein monitoring I/O accesses and storage ownership takeover activity comprises monitoring a Persistent Reservations (PR) pattern of activity to ensure that the failover of the fault tolerant application and the shared storage are co-located at the first site.

13. The method of claim 11, wherein detecting patterns of the I/O accesses and storage ownership takeover activity comprises determining whether the patterns exceed a threshold of pre-determined patterns of I/O activity.

14. The method of claim 11, wherein detecting patterns of the I/O accesses and storage ownership takeover activity is based on a sliding window of the monitored I/O accesses.

15. The method of claim 11, wherein the fault tolerant application is part of a layered guest cluster having a compute witness for failover of the fault tolerant application, and wherein the determination that the fault tolerant application and shared storage are no longer co-located at the first site is independent of the compute witness.

16. The method of claim 11, wherein during degraded I/O performance, a failover of the fault tolerant application to the second site proxies the I/O accesses to the shared storage at the first site.

17. The method of claim 11, wherein the detected patterns of I/O accesses and storage ownership takeover activity are configurable per fault tolerant application.

18. The method of claim 11, wherein failover of the fault tolerant application is uncoordinated with failover of the shared storage.

19. The method of claim 11, wherein detecting patterns of I/O access and storage ownership takeover activity comprises gathering statistics of an amount of data transferred during a sliding window time interval.

20. The method of claim 11, wherein an administratively initiated maintenance triggers failover of one of the fault tolerant application or the shared storage such that they are no-longer co-located.

21. An apparatus comprising:
a network connecting a first node of nodes of a multi-site disaster recovery (DR) environment, the first node having a processor configured to execute program instructions configured to:
monitor input/output (I/O) accesses and storage ownership takeover activity from a fault tolerant application executing on a first site configured for failover to a second site of the DR environment, wherein the I/O accesses are directed to shared storage replicated from the first site to the second site, and wherein the storage ownership takeover activity is directed to establishing and pre-empting ownership of the shared storage;

detect patterns of the I/O accesses and storage ownership takeover activity indicating degraded I/O performance to determine whether the fault tolerant application and the shared storage are co-located at the first site; and in response to determining that the fault tolerant application and shared storage are no longer co-located at the first site, trigger a failover of the shared storage to ensure co-location with the fault tolerant application.

22. The apparatus of claim 21, wherein the program instructions configured to monitor I/O accesses and storage ownership takeover activity are further configured to monitor a Persistent Reservations (PR) pattern of activity to ensure that the failover of the fault tolerant application and the shared storage are co-located at the first site.

23. The apparatus of claim 21, wherein the program instructions configured to detect patterns of the I/O accesses and storage ownership takeover activity are further configured to determine whether the patterns exceed a threshold of pre-determined patterns of I/O activity.

24. The apparatus of claim 21, wherein the program instructions configured to detect patterns of the I/O accesses and storage ownership takeover activity is based on a sliding window of the monitored I/O accesses.

25. The apparatus of claim 21, wherein the fault tolerant application is part of a layered guest cluster having a compute witness for failover of the fault tolerant application, and wherein the determination that the fault tolerant application and shared storage are no longer co-located at the first site is independent of the compute witness.

26. The apparatus of claim 21, wherein during degraded I/O performance, a failover of the fault tolerant application to the second site proxies the I/O accesses to the shared storage at the first site.

27. The apparatus of claim 21, wherein the detected patterns of I/O accesses and storage ownership takeover activity are configurable per fault tolerant application.

28. The apparatus of claim 21, wherein failover of the fault tolerant application is uncoordinated with failover of the shared storage.

29. The apparatus of claim 21, wherein the program instructions configured to detect patterns of I/O access and storage ownership takeover activity are further configured to gather statistics of an amount of data transferred during a sliding window time interval.

30. The apparatus of claim 21, wherein an administratively initiated maintenance triggers failover of one of the fault tolerant application or the shared storage such that they are no-longer co-located.

* * * * *

UNITED STATES PATENT AND TRADEMARK OFFICE
CERTIFICATE OF CORRECTION

PATENT NO. : 12,169,445 B2  
APPLICATION NO. : 18/095271  
DATED : December 17, 2024  
INVENTOR(S) : Anish Jain et al.

Page 1 of 1

It is certified that error appears in the above-identified patent and that said Letters Patent is hereby corrected as shown below:

In the Specification

Column 5, Line 39:  
described herein. The CVM 3M) functions as a distributed  
Should read:  
described herein. The CVM 300 functions as a distributed Column 5, Line 42:  
30) runs as a virtual machine above the hypervisor 220 on  
Should read:  
300 runs as a virtual machine above the hypervisor 220 on Column 8, Line 58:  
1/O and PR activity, detectable by specific patterns or  
Should read:  
I/O and PR activity, detectable by specific patterns or Signed and Sealed this  
Fourteenth Day of October, 2025

John A. Squires  
*Director of the United States Patent and Trademark Office*